United States Patent
Lloyd et al.

(10) Patent No.: US 10,868,324 B2
(45) Date of Patent: Dec. 15, 2020

(54) FLOW BATTERY HAVING A SEPARATOR MEMBRANE COMPRISING AN IONOMER

(71) Applicant: THE CHEMOURS COMPANY FC, LLC, Wilmington, DE (US)

(72) Inventors: Ralph Birchard Lloyd, Fayetteville, NC (US); Murat Unlu, Newark, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

(21) Appl. No.: 14/650,665

(22) PCT Filed: Dec. 17, 2013

(86) PCT No.: PCT/US2013/075602
§ 371 (c)(1),
(2) Date: Jun. 9, 2015

(87) PCT Pub. No.: WO2014/099874
PCT Pub. Date: Jun. 26, 2014

(65) Prior Publication Data
US 2015/0311541 A1    Oct. 29, 2015

Related U.S. Application Data

(60) Provisional application No. 61/738,071, filed on Dec. 17, 2012.

(51) Int. Cl.
*H01M 8/18* (2006.01)
*H01M 8/20* (2006.01)
(Continued)

(52) U.S. Cl.
CPC ........... *H01M 8/18* (2013.01); *H01M 8/1023* (2013.01); *H01M 8/1039* (2013.01);
(Continued)

(58) Field of Classification Search
CPC ............. H01M 8/0293; H01M 8/1062; H01M 8/1039; H01M 8/1023; H01M 8/1053;
(Continued)

(56) References Cited

U.S. PATENT DOCUMENTS 3,282,875 A    11/1966   Connolly et al.
3,692,569 A    9/1972    Grot
(Continued)

FOREIGN PATENT DOCUMENTS

CN    102005554 A    4/2011
EP    0790658        8/1997
(Continued)

OTHER PUBLICATIONS

Chen, Dongyang, et al. "Synthesis and properties of novel sulfonated poly (arylene ether sulfone) ionomers for vanadium redox flow battery." Energy Conversion and Management51.12 (2010): 2816-2824. (Year: 2010).*

(Continued)

*Primary Examiner* — Milton I Cano
*Assistant Examiner* — Philip A. Stuckey

(57) ABSTRACT

The invention relates to flow batteries having improved crossover resistance to electroactive species, excellent coulombic and voltage efficiency and durability, which batteries comprise a separator membrane comprising an ionomer having a high equivalent weight, EW, to achieve these performance benefits. The ionomer has an EW of 1150 to 2000. Preferably, the ionomer is a perfluorosulfonic acid ionomer which has substantially all of the functional groups being represented by the formula —$SO_3X$ wherein X is H, Li, Na, K or $N(R^1)(R^2)(R^3)(R^4)$ and $R^1$, $R^2$, $R^3$, and $R^4$ are the same or different and are H, $CH_3$ or $C_2H_5$. Preferably, substantially all of the functional groups are represented by the formula —$SO_3X$ wherein X is H.

14 Claims, 4 Drawing Sheets

(51) Int. Cl.
*H01M 8/1067* (2016.01)
*H01M 8/1053* (2016.01)
*H01M 8/1023* (2016.01)
*H01M 8/1039* (2016.01)
*H01M 8/1062* (2016.01)
*H01M 8/0293* (2016.01)

(52) U.S. Cl.
CPC ....... *H01M 8/1053* (2013.01); *H01M 8/1062* (2013.01); *H01M 8/1067* (2013.01); *H01M 8/188* (2013.01); *H01M 8/20* (2013.01); *H01M 8/0293* (2013.01); *H01M 2300/0011* (2013.01); *H01M 2300/0082* (2013.01); *H01M 2300/0094* (2013.01); *Y02E 60/50* (2013.01)

(58) Field of Classification Search
CPC ...... H01M 8/1067; H01M 8/20; H01M 8/188; H01M 2300/0082; H01M 2300/0094; H01M 2300/011; H01M 8/18; H01M 2300/0011; Y02E 60/528; Y02E 60/50
See application file for complete search history.

(56) References Cited

U.S. PATENT DOCUMENTS

| | | | |
|---|---|---|---|
| 3,953,566 | A | 4/1976 | Gore |
| 3,962,153 | A | 6/1976 | Gore |
| 4,180,623 | A | 12/1979 | Adams |
| 4,187,390 | A | 2/1980 | Gore |
| 4,358,545 | A | 11/1982 | Ezzell et al. |
| 4,552,631 | A | 11/1985 | Bissot et al. |
| 4,940,525 | A | 7/1990 | Ezzell et al. |
| 5,366,824 | A | 11/1994 | Nozaki et al. |
| 5,626,731 | A | 5/1997 | Cooley et al. |
| 7,557,164 | B2 * | 7/2009 | Felix ............ C08J 5/2237 204/252 |
| 2006/0183016 | A1 * | 8/2006 | Kazacos ............ H01M 8/188 429/105 |
| 2006/0207883 | A1 * | 9/2006 | Koval ............ B01D 61/44 204/518 |
| 2008/0292964 | A1 | 11/2008 | Kazacos et al. |
| 2010/0003545 | A1 * | 1/2010 | Horne ............ B60L 11/1824 429/471 |
| 2011/0318644 | A1 * | 12/2011 | Zhai ............ C08J 5/225 429/249 |
| 2012/0196188 | A1 * | 8/2012 | Zhang ............ H01M 8/103 429/309 |
| 2012/0202099 | A1 | 8/2012 | Perry et al. |
| 2014/0120431 | A1 * | 5/2014 | Roelofs ............ H01M 8/1058 429/408 |
| 2014/0342268 | A1 * | 11/2014 | Kato ............ H01M 8/1023 429/482 |

FOREIGN PATENT DOCUMENTS

| | | |
|---|---|---|
| GB | 1184321 | 5/1968 |
| JP | 11 260390 | 9/1999 |
| WO | 2004/025800 A2 | 3/2004 |
| WO | WO-2012174463 A1 * | 12/2012 ......... H01M 8/1058 |
| WO | 2013100082 A1 | 7/2013 |
| WO | 2013101299 A1 | 7/2013 |
| WO | 2014099874 A1 | 6/2014 |

OTHER PUBLICATIONS

IUPAC. Compendium of Chemical Terminology, 2nd ed. (the "Gold Book"). Compiled by A. D. McNaught and A. Wilkinson. Blackwell Scientific Publications, Oxford (1997). Online version (2019-) created by S. J. Chalk. ISBN 0-9678550-9-8. https://doi.org/10.1351/goldbook. (Year: 2014).*
Chen et al., Synthesis and properties of novel sulfonated poly(aryline ether sulfone) ionorners for vanadium redox flow battery, Energy Conversion and Management, 51, 2010, 2816-2824.
Vafiadis et al, Evaluation of membranes for the novel vandium bromine redox flow cell, Journal of Membrane Science, 279, 2006, 394-402.
International Search Report and Written Opinion, PCT/US2013/075602, dated Mar. 27, 2014.
Will, F. G., Bromine Diffusion Through Nafion® Perfluorinated Ion Exchange Membranes, J. Electrochem Soc.: Electrochemical Science and Technology, Jan. 1979, pp. 36-43, vol. 126, No. 1.
Ponce De León et al., Redox flow cells for energy conversion, Journal of Power Sources, 2006, pp. 716-732.
W L. Gore & Associates, Inc., Gore Technology Enables Toyota Mimi Fuel Cell Electric Vehicle, Nov. 17, 2017, Elkton, Maryland, PRNewsire.
Zhang et al., Preparation of chloromethylated/quaternized poly(phthalazinone ether ketone) anion exchange membrane materials for vanadium redox flow battery applications, Journal of Membrane Science, 2010, pp. 243-249, vol. 363.

* cited by examiner

FLOW BATTERY HAVING A SEPARATOR MEMBRANE COMPRISING AN IONOMER

FIELD OF THE INVENTION

The invention relates to flow batteries having improved crossover resistance to electroactive species, excellent coulombic and voltage efficiency and excellent durability, which utilize a separator membrane comprising an ionomer having a high equivalent weight, EW, to achieve these performance benefits. This invention provides flow batteries having a separator membrane comprising an ionomer having an EW of 1150 to 2000.

BACKGROUND OF THE INVENTION

One of the most promising approaches toward large scale energy storage and power output is the flow battery. A flow battery is a form of rechargeable battery in which electrolyte containing one or more dissolved electroactive species flows through an electrochemical cell that converts chemical energy directly to electricity. Additional electrolyte is stored externally, generally in tanks, and is usually pumped through the cell, or cells, of the reactor, although gravity feed systems are also possible. Flow batteries can be rapidly recharged by replacing the electrolyte liquid while simultaneously recovering the spent material for re-energization.

Three main classes of flow batteries are the redox (reduction-oxidation) flow battery, the hybrid flow battery, and the redox fuel cell. In the redox flow battery, all of the electroactive components are dissolved in the electrolyte. The hybrid flow battery is differentiated in that one or more of the electroactive components is deposited as a solid layer. The redox fuel cell has a conventional flow battery reactor, but the flow battery reactor only operates to produce electricity; it is not electrically recharged. In the latter case, recharge occurs by reduction of the negative electrolyte using a fuel, such as hydrogen, and oxidation of the positive electrolyte using an oxidant, such as air or oxygen.

Commercially, the most promising flow battery systems for large scale energy storage and power output are the vanadium redox battery and the zinc flow battery.

The vanadium redox battery (VRB) is an example of a redox flow battery, which, in general, involves the use of two redox couple electrolytes separated by an ion exchange membrane. The vanadium redox batteries include so-called "All-Vanadium Redox Cells and Batteries" which employ a V(II)/V(III) couple in the negative half-cell and a V(IV)/V(V) couple in the positive half-cell, (sometimes referred to as V/VRB); and "Vanadium Bromide Redox Cells and Batteries" which employ the V(II)/V(III) couple in the negative half-cell and a bromide/polyhalide couple in the positive half-cell, (sometimes referred to as V/BrRB). In either case, the positive and negative half-cells are separated by a membrane/separator which prevents cross mixing of the positive and negative electrolytes, whilst allowing transport of ions to complete the circuit during passage of current. The V(V) ions (in the V/VRB system) and the polyhalide ions (in the V/BrRB system) are highly oxidizing and result in rapid deterioration of most polymeric membranes during use leading to poor durability. Consequently, potential materials for the membrane/separator have been limited and this remains a main obstacle to commercialization of these types of energy storage systems. Ideally, the membrane should be stable to the acidic environments of electrolytes such as vanadium sulfate (often with a large excess of free sulfuric acid) or vanadium bromide; show good resistance to the highly oxidizing V(V) or polyhalide ions in the charged positive half-cell electrolyte; have low electrical resistance; low permeability to the vanadium ions or polyhalide ions; high permeability to charge carrying hydrogen ions; good mechanical properties; and low cost. To date, developing a polymer system suitable with respect to this property balance has remained challenging. Perfluorinated ion exchange polymers such as the perfluorosulfonate polymers (for example, Nafion® polymers, available from DuPont) show exceptional promise in terms of resistance to acidic environments and highly oxidizing species, but so far have been found to be deficient in water and vanadium ion crossover resistance. High vanadium ion crossover results in low coulombic efficiencies, capacity fade, and even self-discharge of the battery, as well as a continuing need to rebalance the electrolyte concentrations in the two half cells. Because of this unwanted capacity fade due to the mix of electroactive ions, the entire battery must be made larger to meet the targeted discharge capacity during times of reduced capacity. Furthermore, the crossover is typically suppressed by using thicker membrane, which significantly increases the cost. This puts flow battery manufacturers at a significant competitive disadvantage relative to other batteries with higher coulombic efficiencies. Clearly, there is a significant incentive to improve the coulombic efficiency of the cell, and the primary means to achieving this is via improved crossover resistance or improved selectivity of charge carrying species versus electroactive species ion crossover.

Several zinc flow batteries exist, of which the zinc-bromine flow battery, and zinc-air flow battery are the most common. The zinc-bromine flow battery is a hybrid flow battery. A solution of zinc bromide is stored in two tanks. When the battery is charged or discharged the electrolyte solutions are pumped through a reactor stack and back into the tanks. One tank is used to store the electrolyte for the positive electrode reactions and the other for the negative electrode reactions. The predominantly aqueous electrolyte is composed of zinc bromide salt dissolved in water. During charge, metallic zinc is plated from the electrolyte solution onto the negative electrode surfaces in the cell stacks, and bromide ions are converted to bromine at the positive electrode surfaces. Some such systems utilize complexing agents to capture the bromine. The reverse process occurs upon discharge, with the metallic zinc oxidized to zinc ions forming zinc bromide in the electrolyte. Similar to the VRB, the two electrode chambers of each cell are separated by a membrane, in this case helping to prevent bromine from reaching the positive electrode, where it would react with zinc causing self-discharge of the battery. Separators, such as Daramic™ polyethylene or polypropylene membranes, have been found to suffer energy-efficiency losses in the battery due to the low resistance to bromine crossover through the membrane, and, as for the VRB case, no polymeric system has yet been found to have the appropriate balance of properties. Accordingly, improved separators with lower bromine mass transport and higher electrolytic (ionic) conductivity would be beneficial for improving the energy efficiency of zinc-bromine batteries.

Other combinations of reactants in a flow battery include Sn (anolyte)/Fe (catholyte), Mn (anolyte)/Fe (catholyte), V (anolyte)/Ce (catholyte), V (anolyte)/$Br_2$ (catholyte), Fe (anolyte)/$Br_2$ (catholyte), and S (anolyte)/$Br_2$ (catholyte). Further examples of a workable redox flow battery chemistry and system are provided in U.S. Pat. No. 6,475,661, the entire contents of which are incorporated herein by reference.

The use of perfluorinated membranes, including perfluorosulfonic acid (PFSA) ionomer membranes, in flow batteries has been explored, for example in U.S. Patent Application No. 2008/0292964 A1 (to Kazacos et al.), however, no commercially satisfactory solution to the above described polymer separator problem has been identified to date. Kazacos and coworkers disclose the use of a Nafion® membrane in a vanadium redox battery. However, commercially available samples of Nafion® (from DuPont, Wilmington, Del., USA) have been somewhat limited in terms of variety, particularly with respect to equivalent weight, EW, of the ionomer. The reference teaches that ionomer having a lower EW (EW of 800 to 1100) is preferred for flow battery polymer separators because such membranes have higher conductivity, water uptake and power density compared with Nafion® ionomer having EW of 1124.

Despite this disclosure, the fundamental issue confronting the use of Nafion® membranes in vanadium redox batteries has remained. What is needed is significantly lower water and vanadium ion crossover, i.e., high coulombic efficiency and minimal capacity fade of the battery over numerous charge/discharge cycles. Specifically, practitioners in the art are looking for at least 95% coulombic efficiency and minimal capacity fade.

The present invention provides flow batteries with a durable polymer separator membrane having improved crossover resistance to electroactive species, and resultant improved lifetime free of electrolyte maintenance. The flow batteries of the invention have at least 95% coulombic efficiency and minimal capacity fade.

SUMMARY OF THE INVENTION

The invention provides flow batteries comprising a polymer separator membrane which latter accomplishes improved crossover resistance to electroactive species, and lower capacity fade, while maintaining the excellent long lifetime and durability of PFSA membranes.

Specifically, the invention provides a flow battery comprising a separator membrane, which membrane comprises one or more ionomer having an equivalent weight, EW, of 1150 to 2000. In an embodiment, the ionomer has an equivalent weight, EW, of 1150 to 1550. In an embodiment, the ionomer is a perfluorosulfonic acid (or perfluorosulfonate) ionomer or a highly fluorinated sulfonic acid (or highly fluorinated sulfonate) ionomer which has substantially all of the functional groups being represented by the formula $-SO_3X$ wherein X is H, Li, Na, K or $N(R^1)(R^2)(R^3)(R^4)$ and $R^1$, $R^2$, $R^3$, and $R^4$ are the same or different and are H, $CH_3$ or $C_2H_5$. Preferably, substantially all of the functional groups are represented by the formula $-SO_3X$ wherein X is H.

In an embodiment, the separator membrane has a thickness of 200 μm or less, or 150 μm or less. In another embodiment, the separator membrane has a thickness of 75 μm or less, or even 55 μm or less, or 30 μm or less, as described herein.

In an embodiment, the separator membrane comprises a cast film from a solution or dispersion of the ionomer. In another embodiment, the separator membrane comprises an extruded membrane of the ionomer.

In an embodiment, the separator membrane comprises two separate layers wherein a first layer comprises an ionomer having EW of from 1150 to 2000, and another layer comprises an ionomer having EW of from 700 to 1150, and wherein the latter EW is lower than the first EW.

In an embodiment, the Coulombic Efficiency of the flow battery is at least 95%, more preferably at least 98%.

In an embodiment, the separator membrane has been pre-treated prior to operating the flow battery, wherein the pre-treatment comprises contacting the membrane with one or more of: i) water, ii) alcohol, iii) organic liquid, iv) an acid, v) a base, or vi) mixtures thereof. In another embodiment, the separator membrane has not been pre-treated prior to operating the flow battery.

In an embodiment, the separator membrane is a reinforced ionomer separator membrane. In one such embodiment, the reinforcement has a pore size no greater than 10 μm, or no greater than 5 μm, or even no greater than 2 μm.

In an embodiment, the separator membrane is an ePTFE reinforced ionomer separator membrane. In one such embodiment, the ePTFE reinforcement has a pore size no greater than 10 μm, or no greater than 5 μm, or even no greater than 2 μm.

In an embodiment, the ePTFE reinforced ionomer separator membrane is an asymmetric ePTFE reinforced ionomer separator membrane.

In an embodiment, the reinforced ionomer separator membrane comprises: (a) a reinforcement layer having a porosity of at least about 45%, preferably at least 65%, and a mean pore size no greater than 10 μm, and having opposing surfaces, and (b) at least one perfluorosulfonic acid or perfluorosulfonate ionomer, or highly fluorinated sulfonic acid or highly fluorinated sulfonate ionomer, impregnated between said opposing surfaces of the reinforcement layer such that the at least one ionomer has a volume fraction of at least 40 percent, preferably at least 60% or even at least 80%, at a midpoint between the opposing surfaces.

In an embodiment, the reinforced ionomer separator membrane has a combined thickness of 400 μm or less, or 200 μm or less, or 150 μm or less, or 75 μm or less, or even 55 μm or less, or 30 μm or less, as described herein.

In an embodiment, the reinforced ionomer separator membrane comprises two or more reinforcement layers.

For each embodiment of a flow battery described herein, there is a corresponding embodiment in which the flow battery is a vanadium redox battery. Similarly, for each embodiment of a flow battery described herein, there is a corresponding embodiment in which the flow battery is a zinc flow battery.

Accordingly, one aspect of the invention provides a vanadium redox battery comprising a separator membrane, which membrane comprises one or more ionomer having an equivalent weight, EW, of 1150 to 2000. In one such embodiment, the ionomer separator membrane comprises a perfluorosulfonic acid (or perfluorosulfonate) ionomer or a highly fluorinated sulfonic acid (or highly fluorinated sulfonate) ionomer which has substantially all of the functional groups being represented by the formula $-SO_3X$ wherein X is H, Li, Na, K or $N(R^1)(R^2)(R^3)(R^4)$ and $R^1$, $R^2$, $R^3$, and $R^4$ are the same or different and are H, $CH_3$ or $C_2H_5$. Preferably, substantially all of the functional groups are represented by the formula $-SO_3X$ wherein X is H.

In an embodiment, the ionomer separator membrane of the vanadium redox battery has a thickness of 200 μm or less, or 150 μm or less, or 75 μm or less, or even 55 μm or less, or 30 μm or less, as described herein.

In an embodiment, the separator membrane of the vanadium redox battery comprises two separate layers wherein a first layer comprises an ionomer having EW of from 1150 to 2000, and another layer comprises an ionomer having EW of from 700 to 1150, and wherein the latter EW is lower than the first EW.

In an embodiment, the Coulombic Efficiency of the vanadium redox battery is at least 95%, more preferably at least 98%.

As outlined above, the separator membrane of the vanadium redox battery may be a reinforced ionomer separator membrane, which may vary as described above. In an embodiment, the reinforcement has a pore size no greater than 10 µm, or no greater than 5 µm, or even no greater than 2 µm.

In an embodiment, the separator membrane of the vanadium redox battery is an ePTFE reinforced ionomer separator membrane. In an embodiment, the ePTFE has a pore size no greater than 10 µm, or no greater than 5 µm, or even no greater than 2 µm.

In an embodiment, the ePTFE reinforced ionomer separator membrane of the vanadium redox battery is an asymmetric ePTFE reinforced ionomer separator membrane.

In an embodiment, the reinforced ionomer separator membrane of the vanadium redox battery comprises: (a) a reinforcement layer having a porosity of at least about 45%, preferably at least 65%, and a mean pore size no greater than 10 µm, and having opposing surfaces, (b) at least one perfluorosulfonic acid (or perfluorosulfonate) ionomer, or highly fluorinated sulfonic acid (or highly fluorinated sulfonate) ionomer, impregnated between said opposing surfaces of said reinforcement layer such that the at least one ionomer has a volume fraction of at least 40 percent, preferably at least 60% or even at least 80%, at a midpoint between the opposing surfaces.

In an embodiment, the reinforced ionomer separator membrane of the vanadium redox battery has a combined thickness of 400 µm or less, or 200 µm or less, or 150 µm or less, or 75 µm or less, or even 55 µm or less, or 30 µm or less, as described herein.

In an embodiment, the separator membrane of the vanadium redox battery comprises two or more reinforcement layers.

Another aspect of the invention provides a zinc flow battery, such as a zinc-bromine flow battery or a zinc-air flow battery, comprising a separator membrane, which membrane comprises one or more ionomer having an equivalent weight, EW, of 1150 to 2000. In one such embodiment, the ionomer separator membrane comprises a perfluorosulfonic acid (or perfluorosulfonate) ionomer or a highly fluorinated sulfonic acid (or highly fluorinated sulfonate) ionomer which has substantially all of the functional groups being represented by the formula —$SO_3X$ wherein X is H, Li, Na, K or $N(R^1)(R^2)(R^3)(R^4)$ and $R^1$, $R^2$, $R^3$, and $R^4$ are the same or different and are H, $CH_3$ or $C_2H_5$. Preferably, substantially all of the functional groups are represented by the formula —$SO_3X$ wherein X is H.

In an embodiment, the ionomer separator membrane of the zinc flow battery has a thickness of 200 µm or less, or 150 µm or less, or 75 µm or less, or even 55 µm or less. or 30 µm or less, as described herein.

In an embodiment, the separator membrane of the zinc flow battery comprises two separate layers wherein a first layer comprises an ionomer having EW of from 1150 to 2000, and another layer comprises an ionomer having EW of from 700 to 1150, and wherein the latter EW is lower than the first EW.

In an embodiment, the Coulombic Efficiency of the zinc flow battery is at least 95%, more preferably at least 98%.

As outlined above, the separator membrane of the zinc flow battery may be a reinforced ionomer separator membrane, which may vary as described above. In an embodiment, the reinforcement has a pore size no greater than 10 µm, or no greater than 5 µm, or even no greater than 2 µm.

In an embodiment, the separator membrane of the zinc flow battery is an ePTFE reinforced ionomer separator membrane. In an embodiment, the ePTFE has a pore size no greater than 10 µm, or no greater than 5 µm, or even no greater than 2 µm.

In an embodiment, the ePTFE reinforced ionomer separator membrane of the zinc flow battery is an asymmetric ePTFE reinforced ionomer separator membrane.

In an embodiment, the reinforced ionomer separator membrane of the zinc flow battery comprises: (a) a reinforcement layer having a porosity of at least about 45%, preferably at least 65%, and a mean pore size no greater than 10 µm, and having opposing surfaces, (b) at least one perfluorosulfonic acid (or perfluorosulfonate) ionomer, or highly fluorinated sulfonic acid (or highly fluorinated sulfonate) ionomer, impregnated between said opposing surfaces of said reinforcement layer such that the at least one ionomer has a volume fraction of at least 40 percent, preferably at least 60% or even at least 80%, at a midpoint between the opposing surfaces.

In an embodiment, the reinforced ionomer separator membrane of the zinc flow battery has a combined thickness of 400 µm or less, or 200 µm or less, or 150 µm or less, or 75 µm or less, or even 55 µm or less, or 30 µm or less, as described herein.

In an embodiment, the separator membrane of the zinc flow battery comprises two or more reinforcement layers.

For each embodiment herein, there exists another embodiment for which the EW of the ionomer is greater than 1150, preferably ranging from 1150 to 2000, or from 1150 to 1900, or even from 1150 to 1550, or from 1200 to 1500.

Another aspect of the invention provides a flow battery, such as a zinc flow battery or a vanadium redox battery, comprising a separator membrane, which membrane comprises one or more ionomer having an ion exchange ratio, IXR, ranging from 16 to 33, or from 16 to 32, or even from 16 to 24, or from 17 to 23. In an embodiment, the ionomer is a perfluorosulfonic acid (or perfluorosulfonate) ionomer or a highly fluorinated sulfonic acid (or highly fluorinated sulfonate) ionomer which has substantially all of the functional groups being represented by the formula —$SO_3X$ wherein X is H, Li, Na, K or $N(R^1)(R^2)(R^3)(R^4)$ and $R^1$, $R^2$, $R^3$, and $R^4$ are the same or different and are H, $CH_3$ or $C_2H_5$. Preferably, substantially all of the functional groups are represented by the formula —$SO_3X$ wherein X is H. As outlined above, the separator membrane of the flow battery may be a reinforced ionomer separator membrane, which may vary as described above. In an embodiment, the Coulombic Efficiency of the flow battery is at least 95%, more preferably at least 98%.

Embodiments of the present invention as described in the Summary of the Invention, and any other embodiments described herein, can be combined in any manner. Accordingly, the invention also includes embodiments which result from combinations of the elements described in each of the above embodiments.

contains 2 M $MgSO_4$ solution in 2.5 M $H_2SO_4$; two sampling ports are labeled (3); the two solutions are separated by the test membrane (4).

Figure 2:
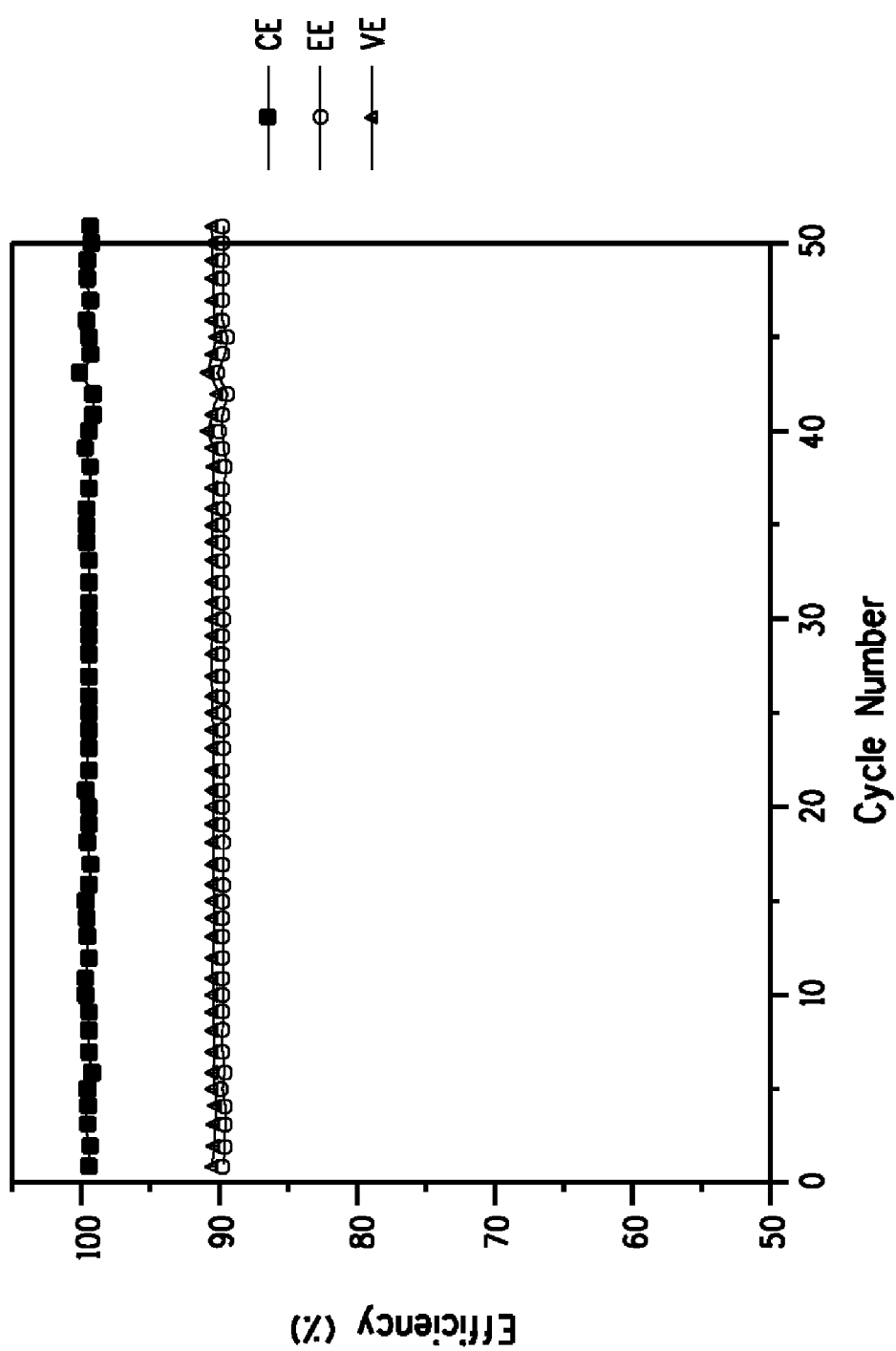

FIG. 2 illustrates the Coulombic Efficiency (CE), Voltage Efficiency (VE), and total Energy Efficiency (EE) for a vanadium redox battery operating over 50 cycles employing a 1500 EW PFSA ionomer separator membrane (not reinforced).

Figure 3A:
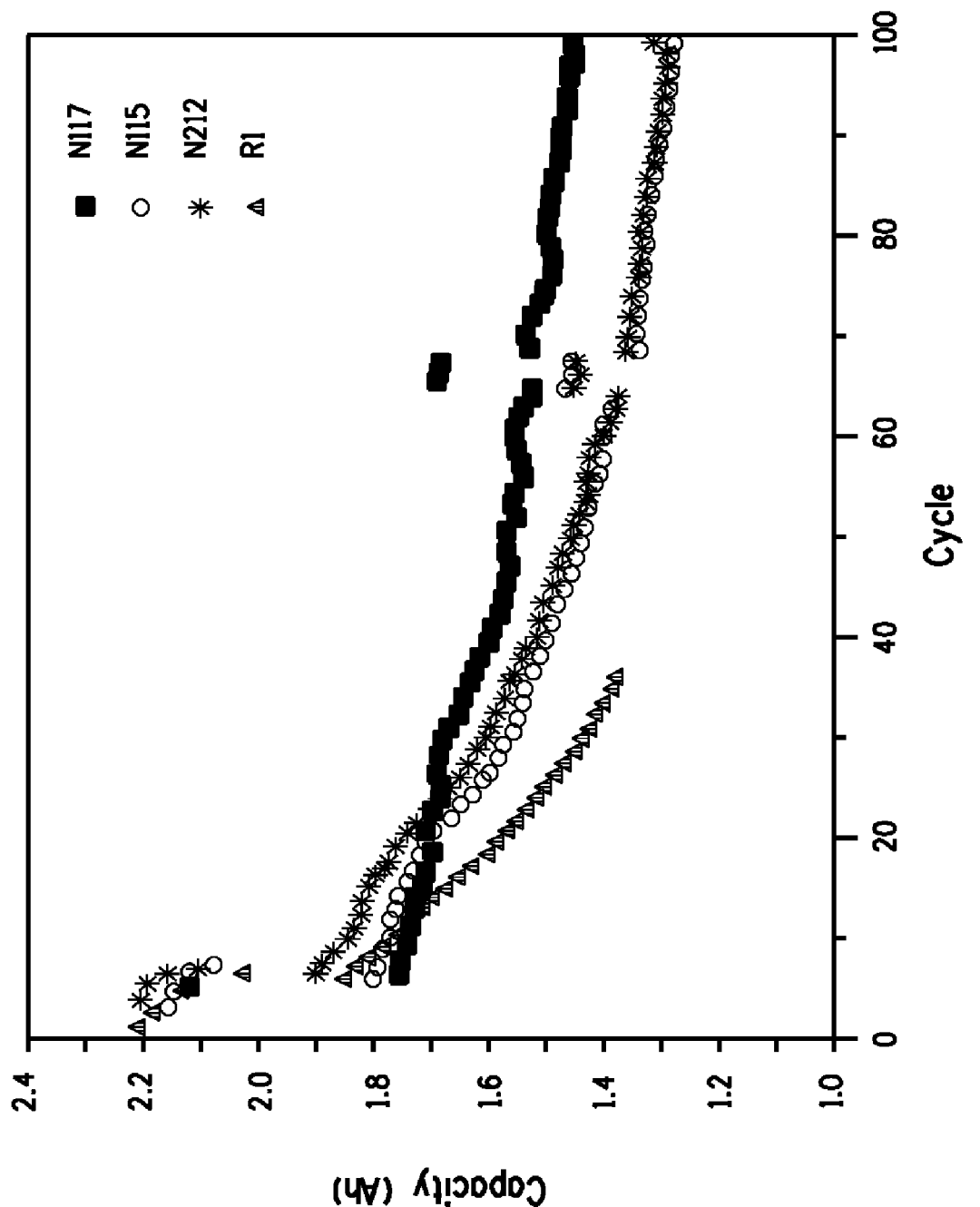

FIG. 3A shows the flow battery capacity for a vanadium redox battery operating over 100 cycles employing the following PFSA ionomer separator membranes i) Nafion® N117 ionomer membrane, not reinforced, ii) Nafion® N115 ionomer membrane, not reinforced, iii) Nafion® N212 ionomer membrane, not reinforced, iv) RI, reinforced ionomer membrane; wherein Nafion® N117 is a ~178 µm thick commercially available membrane, Nafion® N115 is a ~127 µm thick commercially available membrane, Nafion® N212 is a ~51 µm thick commercially available membrane, and RI is a ~30 µm thick reinforced membrane; and wherein each membrane (i)-(iii) comprises an ionomer having an EW of 980-1020, and the RI membrane comprises an ionomer having an EW of ~920. All four separator membranes show significant degradation of battery capacity (capacity fade).

Figure 3B:
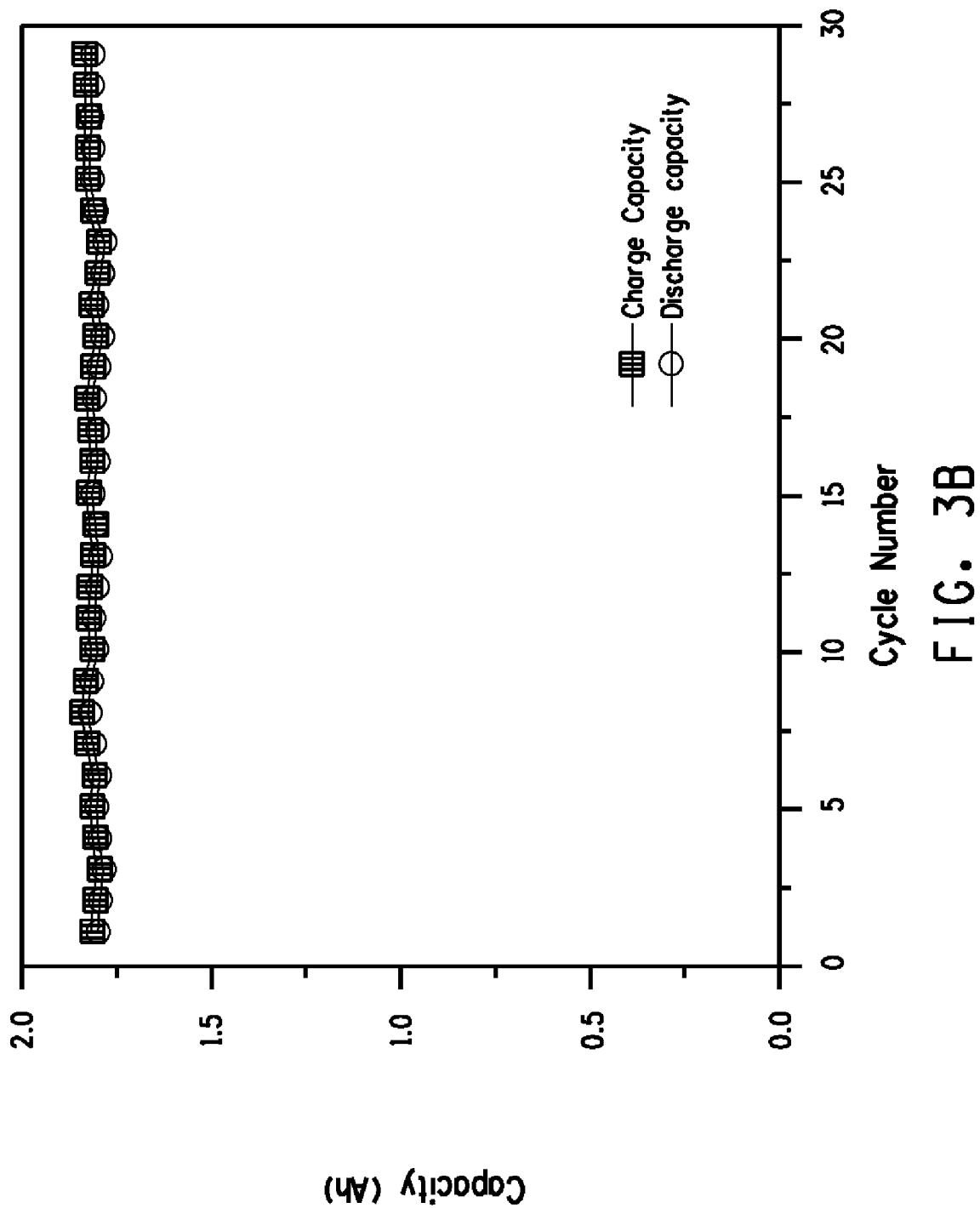

FIG. 3B shows the flow battery capacity for the same vanadium redox battery system operating over 30 cycles employing a 1500 EW PFSA ionomer separator membrane (~25 µm thickness, not reinforced), and showing essentially no capacity fade.

DETAILED DESCRIPTION OF THE INVENTION

Herein, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when describing a range.

Herein, "ionomer" means ion exchange polymer.

For the purposes of the present invention, the term "membrane," a term of art in common use in the flow battery art is synonymous with the terms "film" or "sheet" which are terms of art in more general usage but refer to the same articles. "Separator membrane" is a term of use in the flow battery art wherein the positive and negative half-cells are separated by a separator membrane which prevents cross mixing of the positive and negative electrolytes, whilst allowing transport of ions to complete the circuit during passage of current. (some art practitioners use the term "separator" when they are speaking of the microporous films used in batteries and "membrane" when speaking of monolithic films such as Nafion® PFSA ionomers. In the present invention, the separator necessarily comprises an ionomer, and the whole construct separating the positive and negative half-cells is referred to as a "separator membrane", whether this includes a reinforcement support or not).

Herein, the equivalent weight (EW) of an ionomer is defined to be the weight of the polymer in acid form required to neutralize one equivalent of NaOH.

Herein, "ion exchange ratio" or "IXR" is defined as number of carbon atoms in the polymer backbone in relation to the cation exchange groups.

Herein, the phrase (and similar phrases): "substantially all of the functional groups are represented by the formula $-SO_3X$ wherein X is H" means that the percentage of such functional groups in the $-SO_3H$ form approaches, or is, 100%, such as, for example, at least 98%.

Herein, unless otherwise stated, conductivity refers to proton conductivity.

Herein, and as used in the art, the term "vanadium redox battery" includes all of the types of flow batteries wherein at least one of the redox couple electrolytes comprises vanadium ions in the half cell; and the term "zinc flow battery" includes all of the types of flow batteries wherein at least one of the redox couple electrolytes comprises zinc ions in the half cell.

Herein, the phrase "wherein the membrane has not been pre-treated prior to operating the flow battery" means that prior to operating the flow battery the membrane has not been soaked, or contacted with, or boiled in any reagent such as water, or an acid, or a base, or an alcohol, or an organic liquid such as dimethyl sulfoxide (DMSO), dimethyl acetamide (DMAC), dimethyl formamide (DMF), tetrahydrofuran (THF) or other common protic or aprotic organic solvents (regardless of whether such solvents may or may not be solvents for PFSA polymers).

In an embodiment, the polymer separator membrane may comprise a reinforcement support. The porosity of the reinforcement material is equivalent to 100×(1.0−solidity) and is expressed as a percentage of free volume in the reinforcement material wherein solidity is expressed as a fraction of solid material in the reinforcement material.

"Mean pore size" is measured according to ASTM Designation E 1294-89, "Standard Test Method for Pore Size Characteristics of Membrane Filters Using Automated Liquid Porosimeter." Individual samples of different size (8, 20 or 30 mm diameter) are wetted with a low surface tension fluid (1,1,2,3,3,3-hexafluoropropene, or "Galwick," having a surface tension of 16 dyne/cm) and placed in a holder, and a differential pressure of air is applied and the fluid removed from the sample. The differential pressure at which wet flow is equal to one-half the dry flow (flow without wetting solvent) is used to calculate the mean pore size using supplied software.

The Volume Fraction Ionomer in a reinforced membrane is the volume fraction of ionomer in the reinforced membrane at a given location (i.e., midpoint) and is equal to volume of ionomer/(volume of ionomer+volume occupied by the reinforcement material+volume of air+volume, if any, of additives)=the volume fraction of ionomer in the reinforced membrane at a given location. The volume fraction ionomer has no units as it is volume/volume which cancels, i.e., it is "unit-less".

The volume fraction ionomer in a reinforced membrane is measured by considering volume elements as averages when visually analyzed in cross-sectional view of the membrane from the pictures and graphs generated by using a Scanning Electron Microscope (SEM) [Hitachi S-4700 Cold Cathode Field Emission] with energy-dispersive X-ray spectroscopy (EDS) and Mapping capability.

Herein, the abbreviation "µm" is a unit of length meaning micrometer (a millionth of a meter, i.e. $10^{-6}$ meter, sometimes referred to as "micron").

Ion Exchange Polymers

The flow batteries in accordance with the present invention utilize separator membranes comprising an ionomer having a high EW. Herein, "ionomer having a high EW" means an ionomer having an EW of at least 1150, preferably in a range of from 1150 to 2000, for example, from 1150 to 1950, or from 1150 to 1900, or even from 1150 to 1550, or from 1150 to 1500, or from 1200 to 1500. Preferably, the ionomer comprises a highly fluorinated sulfonate polymer, i.e., having sulfonate functional groups in the resulting membrane. "Highly fluorinated" means that at least 90% of the total number of univalent atoms in the polymer are fluorine atoms. Most preferably, the polymer is perfluorinated. Herein, the term "sulfonate functional groups" means either sulfonic acid groups or salts of sulfonic acid groups, preferably alkali metal or ammonium salts. Most preferably, the functional groups are represented by the formula —$SO_3X$ wherein X is H, Li, Na, K or $N(R^1)(R^2)(R^3)(R^4)$ and $R^1$, $R^2$, $R^3$, and $R^4$ are the same or different and are H, $CH_3$ or $C_2H_5$. In some embodiments of the invention, the sulfonic acid form of the polymer is preferred, i.e., where X is H in the formula above. In further embodiments of the invention, substantially all of the functional groups (i.e., approaching and/or achieving 100%, such as, for example, at least 98%) are represented by the formula —$SO_3X$ wherein X is H. Highly fluorinated sulfonate polymers of this type are known as ion exchange polymers (ionomers).

The ionomer separator membrane may have a thickness of from 2 to 200 µm. For example, the thickness may range from as low as 2 µm, or as low as 5 µm, or as low as 10 µm, or as low as 20 µm or 25 µm, and ranging up to as high as 200 µm, or as high as 150 µm, or as high as 75 µm, or as high as 55 µm, or as high as 30 µm. Typically the ionomer separator membrane thickness is from 15 to 70 µm.

The thickness of the separator membrane may be greater, however, especially if the separator membrane comprises a reinforcement support (see below).

Preferably, the ionomer is a cation exchange polymer. Preferably, the ionomer comprises a polymer backbone with recurring side chains attached to the backbone with the side chains carrying the cation exchange groups. Possible polymers and precursor polymers include homopolymers as well as copolymers of two or more monomers. Copolymers may be formed from one monomer which is a nonfunctional monomer and which provides carbon atoms for the polymer backbone. A second monomer provides both carbon atoms for the polymer backbone and also contributes the side chain carrying the cation exchange group or its precursor, e.g., a sulfonyl halide group such a sulfonyl fluoride (—$SO_2F$), which may optionally be subsequently hydrolyzed to a sulfonate functional group. For example, copolymers of a first fluorinated vinyl monomer together with a second fluorinated vinyl monomer having a sulfonyl fluoride group (—$SO_2F$) can be used. Possible first monomers include tetrafluoroethylene (TFE), hexafluoropropylene, vinyl fluoride, vinylidine fluoride, trifluoroethylene, chlorotrifluoroethylene, perfluoro (alkyl vinyl ether), and mixtures thereof. Possible second monomers include a variety of fluorinated vinyl ethers with sulfonate functional groups or precursor groups which can provide the desired side chain in the polymer. The first monomer may also have a side chain which does not interfere with the ion exchange function of the sulfonate functional group. Additional monomers can also be incorporated into these polymers if desired. Ionomer membranes may be prepared by extrusion or may be cast from solvent, solvent/water mixtures, or aqueous dispersions.

A class of preferred polymers for use in the present invention include a highly fluorinated, most preferably perfluorinated, carbon backbone and the side chain is represented by the formula —(O—$CF_2CFR_f)_a$—O—$CF_2CFR'_f SO_3X$, wherein $R_f$ and $R'_f$ are independently selected from F, Cl or a perfluorinated alkyl group having 1 to 10 carbon atoms, a=0, 1 or 2, and X is H, Li, Na, K or $N(R^1)(R^2)(R^3)(R^4)$ and $R^1$, $R^2$, $R^3$, and $R^4$ are the same or different and are H, $CH_3$ or $C_2H_5$. The preferred polymers include, for example, polymers disclosed in U.S. Pat. No. 3,282,875 and in U.S. Pat. Nos. 4,358,545 and 4,940,525. One preferred polymer comprises a perfluorocarbon backbone and the side chain is represented by the formula —O—$CF_2CF(CF_3)$—O—$CF_2CF_2SO_3X$, wherein X is as defined above. Polymers of this type are disclosed in U.S. Pat. No. 3,282,875 and can be made by copolymerization of tetrafluoroethylene (TFE) and the perfluorinated vinyl ether $CF_2$=CF—O—$CF_2CF(CF_3)$—O—$CF_2CF_2SO_2F$, perfluoro (3,6-dioxa-4-methyl-7-octenesulfonyl fluoride) (PDMOF), followed by conversion to sulfonate groups by hydrolysis of the sulfonyl halide groups and ion exchanging if needed to convert to the desired form. These types of polymers are known as perfluorosulfonate polymers, or, since they are readily convertible to the acid form, perfluorosulfonic acid polymers (PFSA polymers). Ionomers of this type are used in the Examples. Another preferred polymer of the type disclosed in U.S. Pat. Nos. 4,358,545 and 4,940,525 has the side chain —O—$CF_2CF_2SO_3X$, wherein X is as defined above. This polymer can be made by copolymerization of tetrafluoroethylene (TFE) and the perfluorinated vinyl ether $CF_2$=CF—O—$CF_2CF_2SO_2F$, perfluoro(3-oxa-4-pentenesulfonyl fluoride) (POPF), followed by hydrolysis and acid exchange if needed to form the PFSA ionomer. Some PFSA ionomers are available commercially as Nafion® (from DuPont, Wilmington, Del., USA).

In embodiments of the present invention, highly fluorinated carboxylate polymer, i.e., having carboxylate functional groups in the resulting membrane, may be employed as will be discussed in more detail hereinafter. Herein, the term "carboxylate functional groups" means either carboxylic acid groups or salts of carboxylic acid groups, preferably alkali metal or ammonium salts. Most preferably, the functional groups are represented by the formula —$CO_2X$ wherein X is H, Li, Na, K or $N(R^1)(R^2)(R^3)(R^4)$ and $R^1$, $R^2$, $R^3$, and $R^4$ are the same or different and are H, $CH_3$ or $C_2H_5$. The polymer may comprise a polymer backbone with recurring side chains attached to the backbone with the side chains carrying the carboxylate functional groups. Polymers of this type are disclosed in U.S. Pat. No. 4,552,631 and most preferably have the side chain —O—$CF_2CF(CF_3)$—O—$CF_2CF_2CO_2X$. This polymer can be made by copolymerization of tetrafluoroethylene (TFE) and the perfluorinated vinyl ether $CF_2$=CF—O—$CF_2CF(CF_3)$—O—$CF_2CF_2CO_2CH_3$, methyl ester of perfluoro(4,7-dioxa-5-methyl-8-nonenecarboxylic acid) (PDMNM), followed by conversion to carboxylate groups by hydrolysis of the methyl carboxylate groups and ion exchanging if needed to convert to the desired acid form. While other esters can be used for film or bifilm fabrication, the methyl ester is preferred since it is sufficiently stable during normal extrusion conditions. Such polymers also may be prepared by extrusion or may be cast from solvent, solvent/water mixtures or aqueous dispersions.

Herein, "ion exchange ratio" or "IXR" is defined as number of carbon atoms in the polymer backbone in relation to the cation exchange groups. A wide range of IXR values for a polymer are possible. In general use, however, the IXR range used for layers of a membrane may be from about 7 to about 33. For perfluorinated polymers of the type described above, the cation exchange capacity of a polymer is often expressed in terms of equivalent weight (EW). Herein, equivalent weight (EW) is defined to be the weight of the polymer in acid form required to neutralize one equivalent of NaOH. In the case of a sulfonate polymer where the polymer comprises a perfluorocarbon backbone and the side chain is —O—$CF_2$—$CF(CF_3)$—O—$CF_2$—$CF_2$—$SO_3H$ (or a salt thereof), the equivalent weight range which corresponds to an IXR of about 7 to about 33 is about 700 EW to about 2000 EW. IXR for this polymer can be related to equivalent weight using the following formula: 50 IXR+344=EW. While generally the same IXR range has found general use for sulfonate polymers disclosed in U.S. Pat. Nos. 4,358,545 and 4,940,525, the equivalent weight is somewhat lower because of the lower molecular weight of the monomer unit containing a cation exchange group. For the IXR range of about 7 to about 33, the corresponding equivalent weight range is about 500 EW to about 1800 EW. IXR for this polymer can be related to equivalent weight using the following formula: 50 IXR+178=EW. For carboxylate polymers having the side chain —O—$CF_2CF$ $(CF_3)$—O—$CF_2CF_2CO_2X$, an IXR range of from about 12 to about 21 which corresponds to about 900 EW to about 1350 EW. IXR for this polymer can be related to equivalent weight using the following formula: 50 IXR+308=EW.

IXR is used in this application to describe either hydrolyzed polymer which contains functional groups or unhydrolyzed polymer which contains precursor groups which will subsequently be converted to the functional groups during the manufacture of the membranes.

In an embodiment of the invention described herein, the separator membrane comprises an ionomer having a high EW. That is, the ionomer has an EW of at least 1150, preferably in a range of from 1150 to 2000, for example, from 1150 to 1950, or from 1150 to 1900, or even from 1150 to 1550, or from 1150 to 1500, or from 1200 to 1500.

In an embodiment of the invention described herein, the separator membrane comprises two or more different ionomers, which may be present as a blend of two or more ionomers in a membrane, or may be present as two separate layers that make up the separator membrane. In each case, at least one of the ionomers has a high EW. That is, at least one of the ionomers has an EW of at least 1150, preferably in a range of from 1150 to 2000, for example, from 1150 to 1950, or from 1150 to 1900, or even from 1150 to 1550, or from 1150 to 1500, or from 1200 to 1500.

In one such embodiment, the separator membrane comprises two separate layers wherein a first layer comprises an ionomer having a high EW as described above, such as from 1150 to 2000, and another layer comprises an ionomer having a lower EW than the first, such as from 700 to 1150.

In another embodiment, the membrane comprises at least one ionomer possessing carboxylate functional groups as described above and at least one ionomer of high EW, as described above, possessing sulfonate functional groups as described above. For example, the separator membrane may comprise at least one layer of an ionomer possessing carboxylate functional groups, and at least one layer of an ionomer of high EW possessing sulfonate functional groups.

Microporous Reinforcement Supports

Thinner membranes (<50 μm, or even <25 μm) could feasibly be employed to achieve cost advantages and to reduce membrane resistance, but at some minimum thickness they reduce the mechanical strength of the membrane and hence make the membrane weak and subject to breaking during use. In order to solve the above-mentioned problem of mechanical stability, practitioners have proposed the use of a mechanically strong and chemically stable porous reinforcement support material in conjunction with the ionomer membrane. Accordingly, the separator membrane of the flow battery optionally may comprise a microporous reinforcement support.

The microporous supports useful in a process of the invention are preferably made of highly fluorinated nonionic polymers. As for the ion exchange polymers, "highly fluorinated" means that at least 90% of the total number of halogen and hydrogen atoms in the polymer are fluorine atoms. The pore size and porosity of the support are important parameters.

For increased resistance to thermal and chemical degradation, and good resistance to crossover of water and electroactive species, the microporous support preferably is made of a perfluorinated polymer. For example, the porous support can be a specially prepared polymer of polytetrafluoroethylene (PTFE) or a copolymer of tetrafluoroethylene with

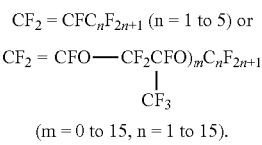

$$CF_2 = CFC_nF_{2n+1} \text{ (n = 1 to 5) or}$$
$$CF_2 = CFO-CF_2CFO)_mC_nF_{2n+1}$$
$$\phantom{CF_2 = CFO-CF_2C}|$$
$$\phantom{CF_2 = CFO-CF_2CF}CF_3$$
$$(m = 0 \text{ to } 15, n = 1 \text{ to } 15).$$

Microporous PTFE sheeting is known and is particularly suitable for use as the microporous support. One support having a small enough pore size to be effective in the present invention is expanded polytetrafluoroethylene polymer (ePTFE) having a microstructure of polymeric fibrils, or a microstructure of nodes interconnected by the fibrils. Films having a microstructure of polymeric fibrils with no nodes present are also useful. The preparation of such suitable supports is described in U.S. Pat. Nos. 3,593,566 and 3,962,153. These patents disclose the extruding of dispersion-polymerized PTFE in the presence of a lubricant into a tape and subsequently stretching under conditions which make the resulting material more porous and stronger. Heat treatment of the expanded PTFE under restraint to above the PTFE melting point (approximately 342° C.) increases the amorphous content of the PTFE. Films made in this manner can have a variety of pore sizes and void volumes. U.S. Pat. Nos. 3,953,566, 3,962,153 and 4,187,390 disclose porous PTFE films having at least 35% voids. Pore size can vary but is typically at least about 0.2 μm; and typically no greater than 10 μm.

In embodiments of the invention the microporous support has a mean flow pore size of between about 0.01 μm and about 20 μm, even between about 0.1 μm and about 10 μm, even between about 0.1 μm and about 5 μm, and even between about 0.01 μm and about 5 μm, or between about 0.01 μm and about 1 μm. These mean pore size values may be obtained after lightly calendaring the material, or in embodiments where no calendaring occurs, before imbibing with the ionomer occurs.

In embodiments of the invention the microporous support has a porosity of no less than 35%, or no less than 50%, and in other embodiments no less than 65%, and in other embodiments no less than 80%. These porosity values may be obtained after lightly calendaring the material, or in embodiments where no calendaring occurs, before imbibing with the ionomer occurs. The high porosity of the microporous support also provides for good ionomer absorption to provide a composite polymer separator membrane.

The thickness of the porous support can be varied depending on the type of composite to be made. The thickness may be from about 20 μm to about 400 μm, or from 30 μm to about 75 μm, or from 30 μm to about 60 μm. However, it may be less than or equal to 30 μm, or less than or equal to 25 μm in thickness, such as, for example, 5-30 μm, or from 10-25 μm in thickness, or even between about 5 μm and 10 μm. The microporous support is thick enough to provide good mechanical properties while allowing good flow of ions.

Suitable microporous ePTFE supports are available commercially from W. L. Gore & Associates, Elkton Md., under the trademark GORE-TEX® and from Tetratec, Feasterville, Pa., under the trademark TETRATEX®.

Microporous supports made using other manufacturing processes with other highly fluorinated nonionic polymers may also be used in the process of the invention, although the pore size and porosity limitations discussed above apply. Such polymers may be selected from the broad spectrum of homopolymers and copolymers made using fluorinated monomers. Possible fluorinated monomers include vinyl fluoride; vinylidene fluoride; trifluoroethylene; chlorotrifluoroethylene (CTFE); 1,2-difluoroethylene; tetrafluoroethylene (TFE); hexafluoropropylene (HFP); perfluoro(alkyl vinyl) ethers such as perfluoro(methyl vinyl) ether (PMVE), perfluoro(ethyl vinyl) ether (PEVE), and perfluoro(propyl vinyl) ether (PPVE); perfluoro(1,3-dioxole); perfluoro(2,2-dimethyl-1,3-dioxole) (PDD); $F(CF_2)_nCH_2OCF=CF_2$ wherein n is 1, 2, 3, 4 or 5; $R^1CH_2OCF=CF_2$ wherein $R^1$ is hydrogen or $F(CF_2)_m$— and m is 1, 2 or 3; and $R^3OCF=CH_2$ wherein $R^3$ is $F(CF_2)_z$— and z is 1, 2, 3 or 4; perfluorobutyl ethylene (PFBE); 3,3,3-trifluoropropene and 2-trifluoromethyl-3,3,3-trifluoro-1-propene.

In an embodiment, the microporous support is made of, or comprises, one or more hydrocarbon based polymers (or copolymers). Although potentially cheaper, prior researchers have reported that such an approach increases the risk of decomposition of the separator membrane and thus shorter lifetime of the separator membrane.

If desired, the microporous support may also include an attached fabric, preferably a woven fabric. Most preferably, such fabrics are made of a yarn of a highly fluorinated polymer, preferably PTFE. If such fabrics are to be used, they are preferably securely attached to the ePTFE support as supplied for use in the process. Suitable woven fabrics include scrims of woven fibers of expanded PTFE, webs of extruded or oriented fluoropolymer or fluoropolymer netting, and woven materials of fluoropolymer fiber. Nonwoven materials including spun-bonded fluoropolymer may also be used if desired.

The reinforced composite membrane in accordance with an embodiment of the invention may be assembled from the high EW ion exchange polymers and microporous supports described above in any manner of art recognized methods, so long as the resultant reinforced composite membrane results in the ion exchange polymer present in the reinforced composite membrane having substantially all of the functional groups (i.e., approaching and/or achieving 100%) being represented by the formula —$SO_3X$ wherein X is H, Li, Na, K or $N(R^1)(R^2)(R^3)(R^4)$ and $R^1$, $R^2$, $R^3$, and $R^4$ are the same or different and are H, $CH_3$ or $C_2H_5$. Preferably, substantially all of the functional groups are represented by the formula —$SO_3X$ wherein X is H.

For example, a coating of the ion exchange polymer may be applied to just one side of the ePTFE support (an asymmetric membrane); or applied to one side, optionally dried, and then a second coating applied on the other side of the support. Alternatively, the microporous support may be laid in a wet sample of the ion exchange polymer and have the latter soak throughout the support. Other techniques, such as transfer coating, also can be used.

Accordingly, the separator membrane may be a composite membrane comprising a reinforcement support and one or more ionomer. The thickness of the composite separator membrane may range as high as the combination of the thickness of the ionomer layer(s) and reinforcement layer(s) described above.

In an embodiment, the reinforced ionomer separator membrane has a combined thickness ranging from as low as 5 μm, or as low as 10 μm, or as low as 12.5 μm or as low as 25 μm, or as low as 50 μm, and may range from as high as 800 μm, or as high as 400 μm, or as high as 200 μm, or as high as 150 μm, or as high as 75 μm, or as high as 55 μm or 30 μm.

Advantageously, very thin films of the composite structure may be obtained. The ePTFE substrate improves the physical durability of the thin films of the composite while allowing lower resistance. In an embodiment, the ePTFE is only partially filled with the ion exchange polymer, such as a PFSA ionomer having high EW (described above), to create a very thin, <12.5 μm (<0.5 mil), supported film. To ensure a continuous coating, this very thin film may have to be laid down in two or more very thin passes since as less dispersion is applied, the ability to fill the pores and form a continuous film decreases. In an embodiment of this type, the wet ion exchange polymer coating may be applied to a Mylar® film base and the ePTFE is laid into the wet coating from the top. The composite film, optionally dried, may then be removed from the Mylar® film base and, if needed, a very thin second pass of ion exchange polymer solution or dispersion may be laid down on the same side of the ePTFE as the first thin film. The resulting structure will have a continuous thin film of ion exchange polymer on one side of the ePTFE, but the other side of the ePTFE will be unfilled and open. Another perhaps more efficient means of accomplishing this is to first coat a very thin film of ion exchange polymer onto Mylar® and dry, then in a second pass apply fresh dispersion on the dried film and then lay in the ePTFE substrate. The second pass of dispersion then acts as the adhesive to bond the continuous film to the substrate. The composite can then be removed from the Mylar®.

In an embodiment of the invention, the flow battery comprises a reinforced composite separator membrane in accordance with the invention, which separator may be prepared by taking a microporous support such as ePTFE and imbibing it with an ionomer solution or dispersion, wherein the ionomer has a high EW, and wherein all of the functional groups (i.e., approaching and/or achieving 100%) are represented by the formula —$SO_3X$ wherein X is H, then drying the imbibed support, and then annealing the dried imbibed support. It is also possible to imbibe the polymer in the —$SO_2F$ form and then carry out hydrolysis of the $SO_2F$ groups to $SO_3H$ in situ, for example hydrolysis of the reinforced composite membrane.

In an embodiment of the invention, the flow battery comprises a polymer separator membrane which is a reinforced composite polymer membrane made of perfluorosulfonic acid ("PFSA") ionomer in the proton form and ePTFE support, wherein the PFSA ionomer has an EW of from 1150 to 2000, or from 1150 to 1900, or 1150 to 1550. The separator membrane may have a thickness ranging from as low as 2 μm, and ranging to as high as 200 μm (8.0 mils), or as high as 75 μm (3.0 mils), or 50 μm (2.0), or 30 μm (1.25), or 25 μm (1.0 mils), or 20 μm (0.8 mils). The separator membrane may even be as thin as 15-20 µm thick (0.6 to 0.8 mils) or 10-15 µm (0.4 to 0.6 mils).

Experimental

Polymer Separator Membranes

The polymer separator membranes of the Examples in accordance with the invention were PFSA ionomer membranes in the sulfonic acid form having varying EW values, and having a thickness of either about 50 µm (2 mils) or about 30 µm (1.25 mil), and a size of about 10 cm×10 cm (4 inch×4 inch).

Testing

Membrane Swelling Measurement

The swelling value for the reinforced membrane was determined using membrane strips punched out from the membrane using a 1"×3" mm die along the direction parallel to MD and TD direction of the membrane (MD and TD are machine direction and transverse direction, respectively; both in the xy plane of the membrane). A punched out strip from MD was taken and it was conditioned in a humidity room (22° C., 50% RH) for 24 hrs. After conditioning the membrane strip, it was placed between polyethylene (PE) sheets and the length of the membrane strip along the long direction was marked on the PE sheet. The distance between these two marks was measured as the dry length $L_d$. After measurement of $L_d$, the membrane strip was boiled in deionized (DI) water for one hour and then it was cooled to ambient temperature by placing it between polyethylene (PE) sheets to prevent water evaporation during the cooling. The length of the membrane strip along the long direction was marked on the PE sheet and the distance between these two marks was measured as the wet (or swollen) length $L_w$. The membrane swelling was calculated using the formula below.

$$\text{Swelling} = \frac{(L_w - L_d)}{L_d} \times 100$$

At least in the thickness range of interest (10-200 µm), the variation in the thickness of the membrane has little effect on the observed swelling results. For cast films, there is also little difference in the observed swelling results in the MD and TD directions. In this case, the high EW PFSA membranes show improved resistance to swelling (i.e. ~4-6% for a 50 µm thickness of the 1500 EW membrane, and ~10% for a 50 µm thickness of the 1200 EW membrane) compared to the 1000 EW membrane, which has average swelling of approximately 15-20% for a 50 µm thickness.

Conductivity Measurement:

Conductivity measurements were made through-plane (current flows perpendicular to the plane of the membrane) using the technique described below. The samples were preconditioned by immersing in 2.5 M sulfuric acid for 3 hours, and slightly rinsed before the test.

Through-Plane (Z Direction) Conductivity

A sample of 1.25 cm diameter was cut from the preconditioned membrane sample and placed in the conductivity fixture. The membrane impedance was measured using Solartron SI-1260 Impedance Analyzer. The conductivity (k) was determined using the following equation, $$\kappa = \frac{l}{(R \times A)}$$

where, R is the membrane impedance, "l" is the membrane thickness (cm) and "A" is the membrane surface area (cm$^2$).

Equivalent Weight (EW) Measurement:

For ion exchange polymers (ionomers), the concentration of ionically conducting units is expressed in terms of so-called equivalent weight. The equivalent weight (EW, expressed as grams per equivalent, or g/eq.) refers to the number of grams of polymer to supply one equivalent of ionic functionality and is defined as the weight of the polymer in acid form required to neutralize one equivalent of NaOH. The EW may be determined using a titration method. Care should be taken to fully protonate all available sites prior to titration, for example, by treating with acid first. See, for example, the titration methods described in G. E. Wnek et al., "New Hydrocarbon Proton Exchange Membranes Based on Sulfonated Styrene-Ethylene/Butylene-Styrene Triblock Copolymers", Electrochemical Society Proceedings Volume 95-23, pages 247-250.

Figure 1:
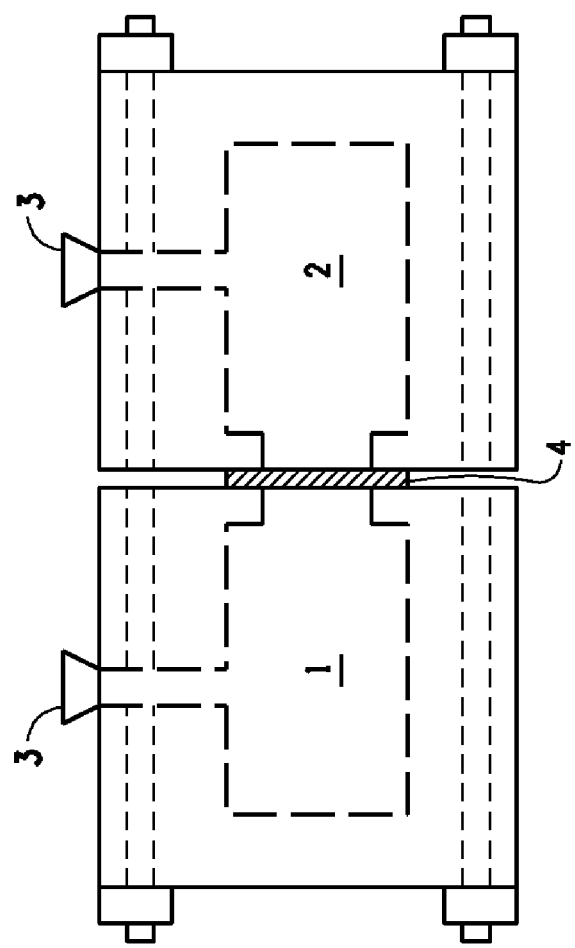
FIG. 1 illustrates the apparatus for the measurement of the permeability of vanadium ion, i.e. V(IV) across a polymer separator membrane. The left reservoir (1) contains 2 M $VOSO_4$ solution in 2.5 M $H_2SO_4$; the right reservoir (2)

Permeability Measurement to Assess Vanadium Crossover:

FIG. 1 illustrates the equipment used for the measurement of the permeability of vanadium ion, i.e. V(IV) across a polymer separator membrane, which, for example, can be used to assess vanadium ion crossover in VRB redox flow batteries. All membrane samples were preconditioned by soaking in 2.5 M H$_2$SO$_4$ for 3 hours then rinsed thoroughly. The samples were kept hydrated until the test.

The V(IV) solution was prepared by dissolving VOSO$_4$ (Aldrich) in 2.5 M H$_2$SO$_4$. In FIG. 1, the left reservoir (1) was filled with 2 M VOSO$_4$ solution in 2.5 M H$_2$SO$_4$, and the right reservoir (2) was filled with 2 M MgSO$_4$ solution in 2.5 M H$_2$SO$_4$; two sampling ports are labeled (3); and the test membrane is labeled (4). MgSO$_4$ was used to equalize the ionic strengths of two solutions and to minimize the osmotic pressure effect. (Vanadium ion crossover is easier to detect in a solution that initially has no vanadium ion present; this allows a comparative study of the effect of different membranes on vanadium crossover). The two solutions were separated by a membrane (4) and continuously stirred using magnetic stir bars during experiments at room temperature. The geometrical area of the exposed membrane was 5.7 cm$^2$ and the volume of the solution in each reservoir was 100 mL. Samples of solution from the right reservoir were taken at regular intervals and analyzed for vanadium ion concentration by UV spectrophotometer. The absorption values were collected at 760 nm. The rate of change in the solution absorbance was used to calculate the diffusion coefficient for vanadium ions. The measurements were performed at room temperature. The vanadium ion concentration obtained using the UV spectrophotometer was also validated by inductively coupled plasma spectroscopy (ICP). Experiments were performed for polymer separator membranes wherein the polymer separator in each case is a PFSA ionomer varying only by EW, for two different ionomer membrane thicknesses, as shown in Table 1, below.

For each membrane, the vanadium crossover was measured as described above and shown in the data table (Table 1) as Diffusion Coefficient, although perhaps better represented by Flux.

Diffusion Coefficient is an intrinsic property of the membrane. Flux of vanadium ions is also reported. Flux corresponds to the absolute crossover value of vanadium ion for the specified membrane across 1 M concentration gradient, reflecting the effect of the thickness.

$$\text{Flux} = \frac{D * \Delta C}{l} = \frac{D * 1M}{l}$$

(D is the Diffusion Coefficient, ΔC is the concentration gradient across the membrane, and l is the membrane thickness). The flux value reported in Table 1 is calculated for unit concentration gradient, i.e., 1 M.

The conductivity reported in Table 1 is thru-plane conductivity, measured as described above.

The ratio of proton conductivity (column 3, in Table 1, below) to vanadium diffusion (column 5, below) was also used as an arbitrary parameter to compare intrinsic properties of membranes, and referred to as "selectivity" (column 7, below).

TABLE 1

$V^{4+}$ Diffusion Coefficient and $H^+/V^{4+}$ Selectivity of Membranes

| Membrane | Thickness μm | Conductivity mS/cm | Areal Resistance mΩ cm$^2$ | $V^{4+}$ Diffusion Coefficient ×10$^{-6}$ cm$^2$ min$^{-1}$ | $V^{4+}$ Ion Flux ×10$^{-7}$ mol cm$^{-2}$ min$^{-1}$ | Selectivity $H^+/V^{4+}$ |
|---|---|---|---|---|---|---|
| ~50 μm | | | | | | |
| 1000 EW | 52 | 71 | 77 | 1.2 | 2.3 | 59 |
| 1200 EW | 53 | 45 | 102 | 0.46 | 0.9 | 97 |
| 1500 EW | 47 | 19 | 223 | 0.16 | 0.3 | 117 |
| ~30 μm | | | | | | |
| 1000 EW | 31 | 63 | 51 | 1.9 | 6.1 | 34 |
| 1500 EW | 31 | 16 | 157 | 0.17 | 0.5 | 98 |

The data show that the higher EW ionomer separator membranes have a lower conductivity and vanadium Diffusion Coefficient than the 1000 EW control membrane and show reduced vanadium crossover (at constant thickness) compared to the 1000 EW control membrane. Surprisingly, as the EW increases, the decrease in vanadium ion diffusion coefficient is greater than the decrease in proton conductivity, i.e. there is a higher selectivity for high EW membranes. The change in polymer morphology of the high EW ionomers favors the proton conductivity over vanadium ion diffusion across the membrane. The 1000 EW control membrane is similar to commercially available Nafion® ionomer membrane, which has been the subject of previous studies reported in the art, but no high EW samples have been made commercially available (or sampled) to date.

It is important to note that high vanadium crossover of current 1000 EW membranes is mainly due to their high diffusion coefficients and is compensated in practice by the expense of using thicker membranes.

Vanadium ion crossover causes significant problems over repeated cycling of the battery and longer periods of operation as would be required in commercial uses. Vanadium ion crossover over longer periods of VRB operation causes capacity fade and accelerates the self-discharge rate of the battery. The latter would require periodic electrolyte maintenance over the lifetime use of the battery, with the associated costs, energy inefficiencies, and down-time issues.

Flow Batteries:

The separator membranes were assessed using PFSA ionomers of varying EW. Ionomers were synthesized to target EW values and the EW determined as described above. The separator membranes were assessed directly in Flow Battery applications, including all-vanadium VRB systems using sulfuric acid electrolyte throughout; all-vanadium VRB systems using a mixed sulfuric acid/hydrochloric acid electrolyte throughout; an Fe/V system using the same mixed acid electrolyte; and a Zn/Fe zinc flow battery system based on the disclosure of U.S. Pat. No. 4,180,623 (to Gordon et al.). In each case, the flow battery was operable with the separator membrane between the anolyte and catholyte solutions. The membranes were all 1 mil (~25 μm) extruded PFSA ionomer membranes, varying in EW as shown in Table 2, and each ionomer membrane was pre-treated with a 24 hour soak in DI water and tested in duplicate (and reported as such in Table 2). Coulombic Efficiency (CE), Voltage Efficiency (VE), and total Energy Efficiency (EE) data are shown below in Table 2.

TABLE 2

Coulombic Efficiency of Membranes in VRB Flow Battery

| Membrane | Coulombic Efficiency (%) | Voltage Efficiency (%) | Energy Efficiency (%) |
|---|---|---|---|
| 1000 EW | 91.4/92.8 | 93.8/93.6 | 85.8/86.9 |
| 1200 EW | 97.0/98.1 | 88.2/88.6 | 86.5/86.9 |
| 1500 EW | 99.2/98.8 | 89.9/86.8 | 89.2/87.9 |

Test condition (50 cycles):
Electrode: 5 mm thick and 10 cm$^2$ area graphite felt (GFD-5 electrode), pre-treated at 400° C. for 6 hours.
Electrolyte: 50 ml 2M vanadyl sulfate mixed-acid electrolyte in each half cell on each side of the membrane. (initially, 2M vanadyl sulfate in the anolyte; 2M vanadyl sulfate in the catholyte; the mixed acid system is 2M sulfuric acid and 5M hydrochloric acid; vanadyl sulfate is vanadium (IV) oxysulfate, VOSO$_4$)
Cell: 20 mL/min flow rate; current density of 50 mA/cm$^2$ for stability test in the voltage window 0.8-1.55 V.
Membrane: pre-soaked in DI water for 24 hours prior to test.

The high EW membranes show stable Coulombic Efficiency of greater than 95%, even as high as 99% for the 1500 EW membranes (see, for example, FIG. 2), and they show minimal capacity fade (for example, see FIG. 3B). The lack of capacity fade shown by the inventive flow battery in FIG. 3B can be contrasted to comparative systems shown in FIG. 3A, which suffer from significant capacity fade.

In repeat experiments for the high EW ionomers (EW=1200 and EW=1500), similar CE, VE and EE were obtained regardless of the pre-treatment conditions (no pre-treatment; DI water soak; acid soaked; methanol soaked; or boiled in water).

The high EW membranes show surprisingly high Energy Efficiency considering the high EW membranes have lower conductivity.

The high EW ionomer membranes have a notably higher Coulombic Efficiency than those reported to date in comparable systems, which also leads to a higher overall Energy Efficiency (EE). Moreover, the high EW ionomer membranes show minimal capacity fade, and have the additional advantage of providing greater mechanical strength and dimensional stability of the membrane, and the ability to use thinner membranes which translates to more economical systems.

What is claimed is:

1. A flow battery comprising an electrochemical cell comprising a separator membrane, which membrane comprises one or more ionomer having an ion exchange ratio, IXR, of 16 to 24, said flow battery having externally stored electrolyte containing one or more dissolved electroactive species, said flow battery being operable to produce electricity when said electrolyte is supplied to the electrochemical cell thereby generating spent electrolyte, said flow battery being arranged and disposed to recover said spent electrolyte, said flow battery being recharged when said spent electrolyte is supplied to said electrochemical cell and is re-energized, wherein the flow battery is a vanadium redox battery comprising a negative half-cell containing a negative electrolyte employing a V(II)/V(III) couple and a positive half-cell containing a positive electrolyte employing a couple selected from V(IV)/V(V) and bromide/polyhalide, said positive and negative half-cells being separated by said separator membrane, wherein said flow battery has a Coulombic Efficiency of at least 95%, and wherein the one or more ionomer is selected from the group consisting of a perfluorosulfonic acid ionomer, a perfluorosulfonate ionomer, a highly fluorinated sulfonic acid ionomer, and a highly fluorinated sulfonate ionomer.

2. The flow battery of claim 1 wherein substantially all of the functional groups of the one or more ionomer are represented by the formula —$SO_3X$ wherein X is H, Li, Na, K or $N(R^1)(R^2)(R^3)(R^4)$ and $R^1$, $R^2$, $R^3$, and $R^4$ are the same or different and are H, $CH_3$ or $C_2H_5$.

3. The flow battery of claim 2 wherein X is H.

4. The flow battery of claim 1 wherein said separator membrane has a thickness of 200 µm or less.

5. The flow battery of claim 1 wherein the separator membrane comprises a cast film from a solution or dispersion of the ionomer.

6. The flow battery of claim 1 wherein the separator membrane comprises an extruded membrane of the ionomer.

7. The flow battery of claim 1 wherein the separator membrane is a reinforced ionomer separator membrane.

8. The flow battery of claim 7 wherein the reinforced ionomer separator membrane is an ePTFE reinforced ionomer separator membrane.

9. The flow battery of claim 7 wherein said reinforced ionomer separator membrane comprises:
   (a) a reinforcement layer having a porosity of at least about 45% and a mean pore size no greater than 10 µm, and having opposing surfaces,
   (b) the one or more ionomer impregnated between said opposing surfaces of said reinforcement layer such that said at least one ionomer has a volume fraction of at least 40 percent at a midpoint between the opposing surfaces.

10. The flow battery of claim 1 wherein said separator membrane comprises one or more ionomer having an ion exchange ratio, IXR, of 17 to 23.

11. The flow battery of claim 1 wherein the Coulombic Efficiency is at least 98%.

12. The flow battery of claim 1, wherein the one or more ionomer has a carbon backbone.

13. The flow battery of claim 1, wherein the one or more ionomer has a perfluorocarbon backbone.

14. The flow battery of claim 1, wherein the at least one ionomer is a copolymer of tetrafluoroethylene and a perfluorinated vinyl ether having a side chain of: —(O—$CF_2CFR_f)_a$—O—$CF_2CFR'_fSO_3X$;
   wherein $R_f$ and $R'_f$ are independently selected from F, Cl, and a perfluorinated alkyl group having 1 to 10 carbon atoms; a=0, 1, or 2; and X is H, Li, Na, K, or $N(R^1)(R^2)(R^3)(R^4)$, where $R^1$, $R^2$, $R^3$, and $R^4$ are the same or different and are selected from H, $CH_3$, and $C_2H_5$.

* * * * *